(No Model.)
C. E. BRUNTHAVER.
BALL BEARING FOR SCREW NUTS.
No. 477,642. Patented June 28, 1892.
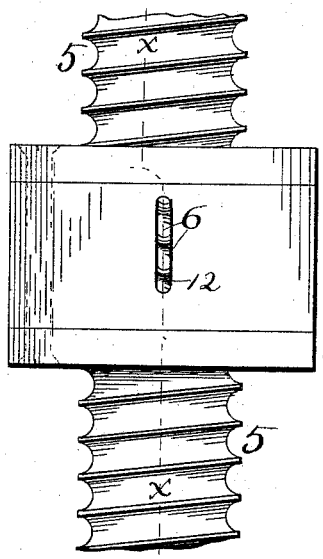
Fig I.
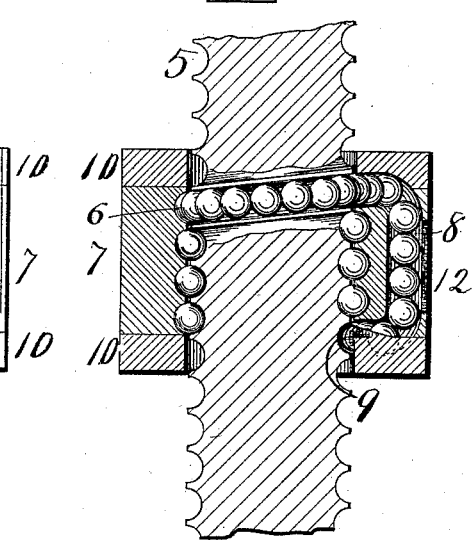
Fig II.
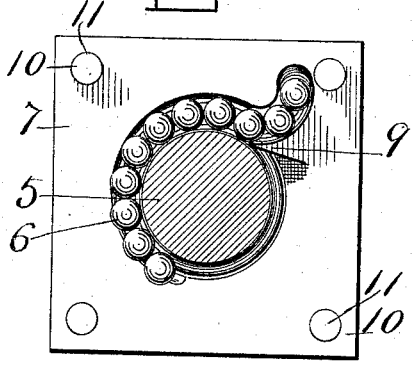
Fig III.
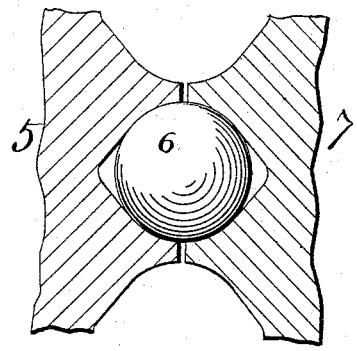
Fig IV.
WITNESSES,
M. C. Hillyard.
P. E. Stevens.
INVENTOR.
Charles E. Brunthaver.
By W. K. Stevens ATTY.

UNITED STATES PATENT OFFICE.

CHARLES E. BRUNTHAVER, OF WASHINGTON, DISTRICT OF COLUMBIA.

BALL-BEARING FOR SCREW-NUTS.

SPECIFICATION forming part of Letters Patent No. 477,642, dated June 28, 1892.

Application filed September 19, 1891. Serial No. 406,224. (No model.)

*To all whom it may concern:*

Be it known that I, CHARLES E. BRUNTHAVER, a citizen of the United States, residing at Washington, in the District of Columbia, have invented certain new and useful Improvements in Ball-Bearings for Screw-Nuts; and I do hereby declare the following to be a full, clear, and exact description of the invention, such as will enable others skilled in the art to which it appertains to make and use the same.

This invention relates to that class of antifrictional devices which are used between the parts of running machinery to lessen friction mechanically; and its object is to provide means whereby the device known as "ball-bearings" may be applied to the bearing of a screw in its nut.

To this end my invention consists in the construction and combination of parts forming a "ball-bearing screw-nut," hereinafter described and claimed, reference being had to the accompanying drawings, in which—

Figure I represents a screw and nut in side elevation according to my invention. Fig. II represents a similar screw and nut in longitudinal section along the irregular line $x$ $x$ of Fig. I. Fig. III represents a similar screw in cross-section and a collar of the nut. Fig. IV represents, on a larger scale, the thread of a screw and nut according to my invention in section longitudinal to the screw.

5 represents a screw which may be any number of threads to the inch, and its threads may be V-shaped or U-shaped or half-square, or of any other form in cross-section which will receive spherical balls 6 of suitable proportions and not permit the balls to enter much, if any, more than half their diameter between the threads.

7 represents the body of the nut, whose characteristic difference from the common nut is that the hole in it which receives the screw is so large that the screw may pass freely through it without the threads of the two engaging or touching each other.

The thread within the nut may be of any suitable form in cross-section, as above described, of the screw-thread, and it should be of the same number to the inch and the same direction of pitch—that is, a right-hand screw to fit a right-hand-threaded nut.

The balls 6 should be spherical and of a size to fit between the threads of the screw and nut and prevent any contact of the two threads with each other, as shown in Figs. II and IV, and there should be balls enough to entirely or nearly fill the space between the threads of the nut from end to end, and also to fill the return-passage 8.

Now it is evident that if the nut and screw were placed together and the threads between were filled with balls 6 and either the screw or the nut were revolved relative to the other the balls would eventually be rolled out of the nut at the end of the thread, and in order to return the balls to the thread I make a passage 8 for the balls lengthwise through the nut at a sufficient distance from the thread to avoid weakening the nut or thread, and this return-passage is made to communicate with the space between the threads at each end of the nut by being curved, so as not to form any corners in which the balls could become blocked, and each curved end terminates in a lip 9, which projects into the groove between the threads to act like a plow in raising the balls as they successively reach that point outward from the thread and direct them into the return-passage. One of these lips is placed at each end of the nut, and as a matter of finish I make each lip as a projection of or from a collar 10, which is to be secured to the body 7 of the nut in any usual manner, such as by machine-screws 11. I have shown the return-passage 8 as made parallel with the screw; but that passage may be made diagonally or spiral to the line of the screw, as experience may dictate, and not vary from the principle of my invention.

12 represents a slot in the nut serving as a window through which the condition of the balls may be observed.

Having thus fully described my invention, what I believe to be new, and desire to secure by Letters Patent, is the following:

The combination of a screw-threaded nut, a screw of similar thread and of a size to pass freely through the nut without engaging the threads, and a series of balls fitting the spaces between the threads of the screw and nut, the said nut being provided with a return-passage for the balls and with plow-pointed lips extending from the wall of the passage between the threads of the screw, substantially as described, whereby the further passage of the balls along the screw-thread is interrupted and the balls are wedged radially away from the body of the screw and deflected into the return-passage.

In testimony whereof I affix my signature in presence of two witnesses.

CHARLES E. BRUNTHAVER.

Witnesses:
P. E. STEVENS,
M. C. HILLYARD.